Patented Oct. 24, 1922.

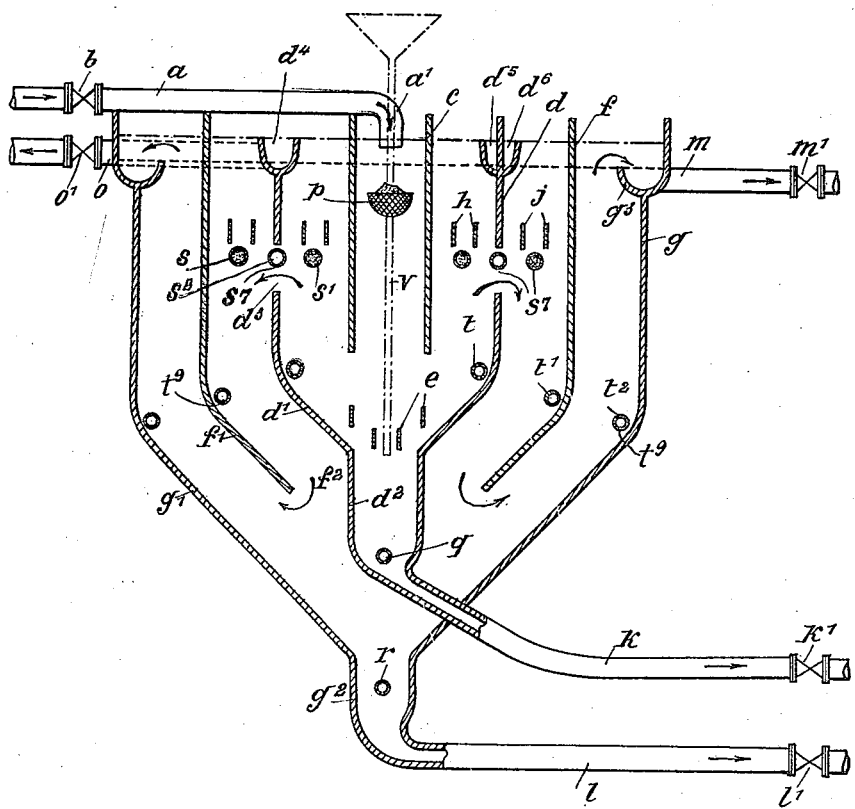

1,432,766

UNITED STATES PATENT OFFICE.

LUCIEN LINDEN, OF LONDON, ENGLAND.

APPARATUS FOR TREATING EFFLUENT OR OTHER LIQUIDS AND FOR THE SEPARATION AND RECOVERY OF MATTERS OF DIFFERENT DENSITIES.

Application filed January 26, 1921. Serial No. 440,006.

*To all whom it may concern:*

Be it known that I, LUCIEN LINDEN, a subject of the King of the Belgians, and residing at London, England, have invented certain new and useful Improvements in Apparatus for Treating Effluent or Other Liquids and for Separation and Recovery of Matters of Different Densities, of which the following is a specification.

This invention relates to the removal of suspended impurities or other matters from liquids in apparatus of the type in which the flowing liquid is subjected to abrupt deflections and to alterations in its velocity resulting from differences in the cross sectional area of the channel, conduit or the like in which it flows.

The object of the invention is to provide a compact and easily manipulated apparatus for effecting a rapid separation of the impurities or other matters such as metal, grease, oil or the like.

The invention consists in apparatus for treating liquids to effect the rapid separation of suspended impurities or matters in which an internal flowing stream of liquid is subjected in succession to abrupt upward, downward and again upward deflection each accompanied by a sudden change of velocity in the neighbourhood of a quiescent space into which the impurities or other matters are projected and eliminated in accordance with their specific gravity.

The invention further consists in apparatus as indicated, in which a medium of lighter specific gravity than the liquid say for example air, is introduced in the neighbourhood of a quiescent space to accelerate the upward projection and elimination of impurities or recovery of other matters of a lighter specific gravity than the liquid.

The invention further consists in apparatus as indicated, in which a heated medium say for example steam, is introduced for freeing greasy matter and assisting its elevation through the liquid.

The invention further consists in apparatus as indicated, in which means is provided for the introduction of chemical reagents which may assist in the precipitation of the lighter or otherwise soluble impurities or other matters.

The invention further consists in apparatus in which means are provided for washing out the apparatus when desired.

The invention also consists in the improvements in apparatus for treating liquids for the removal of suspended or other matters therefrom, as hereinafter described.

The accompanying diagrammatic drawing shows by way of example one form of apparatus for carrying the invention into effect.

In the convenient form of apparatus illustrated in the drawing, the liquid to be treated is discharged by a suitable pipe or main $a$, preferably provided with control means $b$, into the open end of an upright tubular member $c$ extending downward into a cylindrical vessel in the form of a cylinder $d$, having an inverted conical hemispherical or like bottom $d'$ provided with a central pocket $d^2$, the entrance to which is preferably screened by a series of baffles $e$ in the form of a plurality of concentric cylindrical bands arranged so as to provide a cup or dished grid above the entrance to the pocket $d^2$. The vessel $d, d'$ is positioned within two successively larger concentric vessels $f$ and $g$ preferably of similar shape and having bottoms $f', g'$.

Around the cylindrical wall $d$ about midway between the top thereof and the commencement of the converging bottom $d'$ there is provided a continuous opening or series of openings $d^3$ having an area at least equal to the cross sectional area provided between the cylindrical wall $d$ and the upright central tubular member $c$. Above the opening or openings $d^3$ there is preferably positioned a series of concentric bands $h, j$ forming a grid extending across the space in the first vessel and also the space between the first vessel and the wall $f$ of the second vessel.

The second vessel $f, f'$ is of such a size that the space or channel between its walls and the walls of the first vessel $d, d'$ is considerably larger than the space between the walls of the first vessel and the tubular member $c$, the proportion between the spaces being maintained also between the conical or like converging bottoms of the vessels. The bottom $f'$ of the second vessel has a large central aperture $f^2$ surrounding the pocket $d^2$, which also provides a cross sectional area at least equal to the space in the second vessel leading thereto.

The third vessel $g, g'$ is of the same shape as the others and also provided at its bottom end with a central pocket $g^2$, the dimensions of this vessel being such that the space between it and the vessel $f, f'$ is considerably larger than the space between the vessels $d, d'$, and $f, f'$.

Drain pipes or conduits $k$ and $l$ are carried from the bottom of the pockets of the first and third vessels either concentrically or in any suitable way to the exterior of the apparatus where they are each provided with control valves $k'$ and $l'$, after which they may, if desired, be connected and carried upward to a further control valve which is capable of easy access for controlling the outlet of the sludge from the apparatus when the elimination of impurities only is desired. For other purposes the pipes may be taken to separate suitable receivers or the like.

Around the vessel $g$ a little below its upper edge is arranged a collecting trough or gutter $g^3$ at the level at which the liquid is intended to stand during working conditions, this trough being provided with an outlet pipe $m$ fitted with a suitable control valve $m'$.

Around the upper edge of the vessel $d$, at a lower level than the upper edges of the vessels $f$ and $g$, but above the trough $g^3$, there is provided a trough $d^4$ or if preferred a pair of concentric troughs $d^5, d^5$, as shown on its opposite side, this trough or pair of troughs being provided with a suitable outlet pipe or pipes such as $o$ controlled by valve means such as $o'$.

The pipe $a$ conducting the liquid into the mouth of the upright tubular member is provided with a downwardly turned end $a'$, which preferably terminates above a perforated cup or basket $p$ which may contain a solid chemical reagent if desired.

Within the bottom of the pockets $d^2$ and $g^2$ of the first and third vessels tubes $q$ and $r$ are provided with perforations or roses or plain orifices for admitting steam in streams of any desired subdivision when desired and similarly perforated tubes $s$ and $s'$ are carried in rings below the series of bands $h$ and $j$ forming the grid above the opening $d^3$ between the first and second vessels. Tube rings $t, t'$ and $t^2$ are also provided round the angle or radius where the bottom joins the cylindrical walls of the vessels, said tubes being provided with apertures $t^9$ pointing in the direction of the surface of the bottom through which water with chemical if desired under a desirable pressure may be discharged for washing out the apparatus when desired.

Carried round within the aperture $d^3$ is a circular tube $s^2$ having apertures $s^7$ pointing into the spaces in both the first and second vessels through which air under pressure may be discharged when desired for assisting in lifting impurities or other matters of a lighter specific gravity than the liquid to the surface of the spaces in the first and second vessels.

The apparatus operates as follows:—

The effluent or other liquid containing matter which is to be separated therefrom passes from the downturned outlet $a'$, of the inlet main $a$ into the central upright tube $c$, flowing, if desired, over a solid reagent which will be gradually dissolved and operate in the liquid to fix light impurities (or other matters) or by chemical action to convert into insoluble suspended matter other impurities or matters which might at the time be in solution in the liquid.

The liquid passes from the bottom of the central tube $c$ into the first vessel $d, d'$ with sufficient velocity to project the heavier of the impurities or matters through the protecting grid $e$ into the comparatively quiescent space in the pocket $d^2$, where they are discharged at will while the liquid with the lighter impurities or matters rises up to the space between the central member and the walls of the first vessel at a reduced speed. The liquid then passes through the aperture $d^3$ into the space between the first and second vessel, in which a further immediate reduction in its velocity and an abrupt deflection occurs. This results in the projection of impurities or matters of a lighter specific gravity than the liquid upward through the protecting grid $h$ and $j$ into a quiescent space above the grid from where they may be eliminated at will.

The liquid now passes downward between the first and second vessels at the lower velocity and through the aperture $f^2$ to the bottom of the second vessel into the space between the second and third vessel where it undergoes a third abrupt deflection and sudden reduction of velocity, finally rising within the third vessel $g, g'$ and overflowing into the trough $g^3$.

When the liquid contains impurities or other matters of a lighter specific gravity than the liquid, compressed air from the circular pipe $s^2$ is admitted below the protecting upper grid $h, j$ to assist in carrying this matter to the surface of the liquid in the space of the first and second vessels. When any appreciable amount of this matter has collected upon the surface, the outlet $m$ from the apparatus may be closed until the level of liquid has risen sufficiently for the lighter liquid or other matter, which may for example be of a greasy nature, to overflow into the one or two troughs provided around the upper edge of the first vessel. Where the collection of this greasy or other lighter matters is of importance, as for example in the separation of metals by the flotation process, two or more troughs are preferably provided, each with separate outlets, so that matter of different consistencies and which may be subjected to different after-treatment may be obtained therefrom.

Where the liquid contains greasy matter which is liable to entangle heavier impurities or matters which would alter its specific gravity, either or both of the steam jets $s$, $s'$ may be employed for softening or melting the grease and allowing the matter of greater and less specific gravities than the liquid to separate. Admission of steam may also be employed in the pockets of the first and third vessels at the pipes $q$ and $r$ for melting grease which may be entangled with heavier matter and allowing its passage through the liquid. Air or other fluids may be also admitted for the treatment of the deposit.

In some instances, the apparatus may be provided with a small central pipe $v$ shown in dot and dash lines passing downward to the top of the pocket $d^2$ through which lime in solution or the like may be introduced for co-acting with the impurities in the pocket and rendering their settlement more certain, and (or) to sterilize, if required, the deposit.

The apparatus may be formed in any size and repetition of means suitable for the quantity of liquid to be treated, and if desired two or more sets of apparatus, preferably of successively increasing dimensions may be employed together to treat the liquid one after the other when prolonged settlement is desirable.

The waste water resulting from various trade processes may be effectively treated in this apparatus to render it fit for reutilization, or the effluent from houses, works or any other source may be in like manner treated to render them of sufficient purity to be discharged into rivers or the like.

The apparatus hereinbefore described may be advantageously used for treating water intended for domestic consumption or for industrial purposes or for sewage and for all other applications where it will be usefully indicated, as for example for the treatments and recoveries of metals, oil, petroleum and the like.

Although described as cylindrical, the vessels employed in the apparatus may be rectangular or of any desired form with suitable converging bottoms. Other alterations and additions may also be introduced without in any way departing from the spirit of this invention.

Having thus fully described my invention, what I claim and desire to secure by Letters Patent is:—

In an apparatus for treating liquids to effect the rapid separation of suspended matter therefrom, means whereby an internal flowing stream of liquid is subjected in succession to abrupt upward, downward and again upward deflection, means for causing each deflection to be accompanied by a sudden change of velocity in the neighbourhood of a quiescent space into which the impurities or like matter are projected, means for separating and eliminating the constituents according to their specific gravity in distinct locations, means for introducing a medium of lighter specific gravity than the liquid, such as air, in the neighbourhood of a quiescent space, and means whereby a heated medium such as steam is introduced for freeing greasy matter and assisting its elevation through the liquid, substantially as described.

In testimony whereof I affix my signature.

LUCIEN LINDEN.